United States Patent [19]

Malwitz et al.

[11] 4,425,446

[45] Jan. 10, 1984

[54] UREA-MODIFIED ISOCYANURATE FOAM, COMPOSITION AND METHOD

[75] Inventors: Nelson Malwitz, Brookfield; Ronald J. Wierzbicki, New Milford, both of Conn.

[73] Assignee: Sealed Air Corporation, Fairlawn, N.J.

[21] Appl. No.: 391,008

[22] Filed: Jun. 23, 1982

[51] Int. Cl.³ .............................................. C08G 18/14
[52] U.S. Cl. ...................................... 521/108; 156/79; 502/162; 502/167; 502/170; 521/113; 521/114; 521/115; 521/125; 521/128; 521/129; 521/130; 521/131; 521/902
[58] Field of Search ............... 521/108, 113, 114, 115, 521/125, 128, 129, 130, 131, 902; 156/79; 252/426, 431 R, 431 L

[56] References Cited

U.S. PATENT DOCUMENTS

| | | | |
|---|---|---|---|
| 2,690,987 | 10/1954 | Jeffries et al. | 428/317.5 |
| 2,853,473 | 9/1958 | Campbell | 8/115.6 |
| 3,072,582 | 1/1963 | Frost | 521/131 |
| 3,168,483 | 2/1965 | Beltchman et al. | 252/426 |
| 3,180,846 | 4/1965 | Haggis | 528/44 |
| 3,203,932 | 8/1965 | Frisch et al. | 528/55 |
| 3,391,093 | 7/1968 | Frost | 521/131 |
| 3,524,825 | 8/1970 | Rill, Jr. | 521/131 |
| 3,620,985 | 11/1971 | Larkin et al. | 521/124 |
| 3,657,161 | 4/1972 | Bernard et al. | 521/155 |
| 3,666,848 | 5/1972 | Harper et al. | 264/39 |
| 3,681,272 | 8/1972 | Gloskey | 521/115 |
| 3,720,632 | 3/1973 | Argabright et al. | 521/131 |
| 3,726,816 | 4/1973 | Fabris et al. | 521/126 |
| 3,730,923 | 5/1973 | Formaini et al. | 521/166 |
| 3,793,236 | 2/1974 | Ashida et al. | 521/118 |
| 3,803,064 | 4/1974 | Fishbein et al. | 521/107 |
| 3,876,567 | 4/1975 | Larkin et al. | 521/125 |
| 3,880,782 | 4/1975 | Rambosek | 521/105 |
| 3,884,917 | 5/1975 | Ibbotson | 544/180 |
| 3,887,501 | 6/1975 | Narayan et al. | 521/107 |
| 3,896,052 | 7/1975 | Lockwood et al. | 252/431 C |
| 3,931,065 | 1/1976 | Ashida | 521/174 |
| 3,933,692 | 1/1976 | Kushlefsky et al. | 521/115 |
| 3,943,075 | 3/1976 | Fishbein et al. | 521/174 |
| 3,965,052 | 6/1976 | Iwasaki | 521/107 |
| 3,981,828 | 9/1976 | Demou et al. | 521/110 |
| 3,984,359 | 10/1976 | Collins et al. | 521/167 |
| 3,993,608 | 11/1976 | Wells | 428/313.9 |
| 4,026,840 | 5/1977 | Bechara et al. | 521/118 |
| 4,040,992 | 8/1977 | Bechara et al. | 521/117 |
| 4,049,931 | 9/1977 | Sandner et al. | 521/127 |
| 4,071,482 | 1/1978 | Hopkins, Jr. et al. | 521/130 |
| 4,092,276 | 5/1978 | Narayan | 521/108 |
| 4,098,732 | 7/1978 | Yukuta et al. | 521/125 |
| 4,100,354 | 7/1978 | Owen, Jr. | 560/89 |
| 4,101,465 | 7/1978 | Lockwood et al. | 521/118 |
| 4,111,914 | 9/1978 | Kresta et al. | 528/48 |
| 4,122,038 | 10/1978 | Sandner et al. | 252/431 C |
| 4,129,697 | 12/1978 | Schapel et al. | 521/176 |
| 4,145,318 | 3/1979 | Ohashi et al. | 521/112 |
| 4,148,980 | 4/1979 | Narayan | 521/115 |
| 4,156,760 | 5/1979 | Zimmerman | 521/129 |
| 4,180,631 | 12/1979 | Yukuta et al. | 521/164 |
| 4,184,022 | 1/1980 | Lawyer | 521/118 |
| 4,189,544 | 2/1980 | Thompson | 521/128 |
| 4,205,136 | 5/1980 | Ohashi et al. | 521/118 |
| 4,221,877 | 9/1980 | Cuscurida et al. | 521/160 |

OTHER PUBLICATIONS

Plastics World "An Alternative to Urea Formaldehyde Polyurea Foam Insulation" Sep. 1980, pp. 80–82.

*Primary Examiner*—Maurice J. Welsh
*Attorney, Agent, or Firm*—Lerner, David, Littenberg, Krumholz & Mentlik

[57] ABSTRACT

A process and a foam produced therefrom are disclosed in which multi-functional isocyanate, water, a catalytic amount of a urea polymerization catalyst, and a catalytic amount of an isocyanurate polymerization catalyst are reacted to form a rigid, closed cell, urea-modified polyisocyanurate foam suitable for use for retrofitting wall cavities with insulating material. The urea polymerization catalyst and the isocyanurate polymerization catalyst are present in the reaction mixture in relationship to the multi-functional isocyanate and water in amounts so as to produce a foam setting after substantially complete rising thereof. Activator compositions for preparing such foams are also disclosed.

64 Claims, No Drawings

UREA-MODIFIED ISOCYANURATE FOAM, COMPOSITION AND METHOD

BACKGROUND OF THE INVENTION

The present invention relates to polymeric foams. More specifically, the invention relates to ureamodified isocyanurate foams and methods of making and using such foams.

In today's energy conservation conscious world, finding ways to better insulate our homes, is foremost on the minds of a great many people. Mnay different materials have been used for such insulation. For example, fiberglass insulation provides good insulation characteristics for insulation of walls, ceilings, etc. of homes. However, a large number of homes have been built in the past without sufficient insulation in their walls. Obviously, it would be very costly to rip out the walls of a home to retrofit them with insulation materials such as fiberglass. Accordingly, methods which would avoid such distruction of the walls are extremely advantageous.

Various foam materials have been used in the past in an attempt to retrofit wall cavities with insulation materials. For example, ureaformaldehyde and phenolformaldehyde foams have been previously used by pumping such foam into the wall cavity through a hole placed in the walls. Ureaformaldehyde foam has a number of disadvantages including friability, release of toxic formaldehyde if poorly applied, shrinkage with subsequent loss of insulation effectiveness, and limited warm temperature resistance that prohibits its use in walls in warmer climates and in attics. The major drawback of loose-fill insulation products is settling with time, creating uninsulated voids in wall cavities. Impracticality prohibits the use of more conventional insulation materials (such as, urethane board stock, fiberglass, polystyene, foamed glass, polyolefin foams) to retrofit wall sections simply because of the difficulty of manufacturing and/or installing at the site without extensive building damage.

Polyurethane and polyisocyanurate foams are well-known as effective insulation materials. However, using such prior polyurethane or polyisocyanurate foams to retrofit wall cavities with insulation has met with certain difficulties. First, the polyurethane or polyisocyanurate insulating foams have been too dense to make them economical as insulation for wall cavities. For example, most walls contain cavities in the range of three and five-eights inches thick. The amount of polyurethane or polyisocyanurate foam needed to fill these large cavities cannot be economically justified in terms of the insulation obtained by the foam, e.g., satisfactory insulation characteristics would be economically obtained with a foam about 2 inches thick. Moreover, the prior polyurethane or polyisocyanurate foams used to retrofit wall cavities with insulation have had other problems because they have rise times which greatly exceed their gel or set times. Thus, such a foam first sets within the wall cavity to such an extent that the pressure generated within the cavity causes damage as the foam completes its expansion. Also, excess foam inadvertently admitted into the wall cavity will not continue to extrude through the access hole in the wall. The foam then continues to expand creating a pressure pushing on the walls of the cavity, in many instances causing buckling or even cracking of the walls.

Various methods of retrofitting wall cavities with foam materials are disclosed in the prior art. For example, U.S. Pat. No. 2,690,987 discloses a resin foamed structure in which an alkyd resin-diisocyanate mixture is used as a coating composition on the inner face of the structure walls. A foaming composition containing diisocyanate is then introduced between the wall surfaces. The coating is said to aid the free rise of the foam during the gas evolution step and to lubricate the walls of the structure and allow a free rise of the foam.

A large number of other patents disclose certain polyurethane, polyisocyanurate and polycarbodiimide foams, e.g., U.S. Pat. Nos. 3,524,820; 3,666,848; 3,876,867; 3,884,917; 3,887,501; 3,896,052; 3,965,052; 3,384,359; 4,092,276; 4,101,465 and 4,129,097. A number of these patents disclose processes for preparing foams employing, i.a., isocyanurate or urea polymerization catalysts. Other patents disclose the use of certin combinations of gelling catalysts such as Sn or Sb based catalysts with a second catalyst, but the gelling catalyst causes quick gelling and therefore do not provide a desirable reaction profile to make such foams useful as retrofit insulation. Moreover, none of these patents discloses a process for preparing a rigid, closed cell, urea modified isocyanurate foam suitable to fill wall cavities as insulating material by employing a combination of isocyanurate and urea catalysts to provide a foam having a low density, good insulation characteristics, and a rise time greater than the gel or set time.

SUMMARY OF THE INVENTION

It has now been found that a rigid, closed cell, urea modified polyisocyanurate foam is highly suitable for retrofitting wall cavities with insulating material. The foam, in accordance with the present invention, can be made by reacting multi-functional isocyanate, water, a catalytic amount of a urea polymerization catalyst and a catalytic amount of an isocyanurate polymerization catalyst, wherein said urea polymerization catalyst and said isocyanurate polymerization catalyst are present in relationship to the multi-functional isocyanate and water in amounts so as to produce a foam setting after substantially complete rising thereof. The water, urea polymerization catalyst and isocyanurate polymerization catalyst, along with other optional ingredients such as polyols, polyamines, blowing agents, softening agents, combustion modifiers and/or surfactants, form activator compositions for preparing such foams.

The foams of the invention have a number of highly advantageous properties. Such foams are good insulators with a relatively low density, preferably in the range of from about 0.6 to about 1.5 pounds per cubic foot, and morepreferably, from about 1.0 to about 1.2 pounds per cubic foot. On the other hand, they provide good insulation even with 3 to 4 inches thickness. Thus, when these foams are formed in a wall cavity of a house, they provide good insulation at a more economical cost. It also provides good fire resistant properties by virtue of its reduced flame spread and low smoke generation. Moreover, these foams have gel times which approximate or equal the rise time of the foam, so that, when the foam is formed in the wall cavities of a house, the foam substantially completes its rise prior to setting and thus puts a minimum amount of pressure on the walls of the cavity.

DETAILED DESCRIPTION OF THE INVENTION

The foams of the present invention are rigid, closed cell, urea-modified isocyanurate foams. Rigid foams are characterized, for example, as having a glass transition temperature above room temperature, a high ratio of compressive to tensile strength (about 0.5 to 1 or greater), low elongation (less than about 10%), a low recovery rate from distortion, and/or a low elastic limit. Flexible foams by contrast are usually urethane foams and have a high tensile strength to compressive strength (25% deflection) ratio, usually around 15 to as high as 60 or 70 to 1; high elongation; a fast recovery; and a high elastic limit. The foams of the present invention are thus distinguished from many of the prior art foams which are flexible urethane foams. Moreover, the rigid closed-cell, urea modified isocyanate foams of the invention provide better retrofit insulating characteristics than the prior flexible urethane foams.

It should be explained that "rise time" or "substantially complete rising" as used in the present application is intended to refer to the major or initial rise time of the foam. Actually, the foams of the invention have two rise times. The initial or major rise occurs typically at about 95% of the final volume and, with the present invention, the initial rise time take place prior to gelling or setting the foam. This initial rise time is the time normally referred to as "rise time" in the art. A second minor rise (which determines the final rise time) of about an additional 5 volume percent or less typically takes place with the present invention after gelling or setting of the foam. However, because the foam during the second rise after gelling is still soft enough so that it can be comprised within the wall cavity, the foam does not exert any significant pressures that might damage wall sections.

Any of the multi-functional isocyanates well known in the art can be used in the present invention. By multi-functional isocyanate, monomers and polymers containing at least two (2) isocyanate groups are intended. Suitable isocyanates for use in the present invention include diisocyanates and higher functionality polyisocyanates, including both aliphatic and aromatic multi-functional isocyanates. Representative of suitable diisocyanates are 2,4-toluene diisocyanate, 2,6-toluene diisocyanate (TDI), diphenylmethane diisocyanate (MDI), hexamethylene diisocyanate (HDI), naphthalene diisocyanate (NDI), isoparone diisocyanate (IPDI) and dicyclohexamethylene diisocyanate (hydrogenated (MDI). Suitable higher functionality polyisocyanates include, for example, crude toluene diisocyanate, toluene polyisocyanate and crude diphenylmethane diisocyanate, also known as "polymeric isocyanate" or "polymethylene polyphenylisocyanate". Representative of compositions containing the higher functionality polyisocyanates are those available under the tradenames MONDOR MR (Mobay Chemical Company), PAPI (Upjohn Company) and RUBINATE M (Rubicon Chemical Company). A preferred multi-functional isocyanate is a mixture of diphenyl methane diisocyanate (MDI) and oligomers of diphenyl methane diisocyanate (crude MDI). This crude MDI prepolymer material is available under the tradename RUBINATE M from Rubicon.

Suitable urea polymerization catalysts for use in the present invention include those which selectively catalyze the reaction of water and multi-functional isocyanates. The urea polymerization catalyst employed in the present invention should be one which predominantly causes the reaction between water and multi-functional isocyanate to provide a reaction profile such that the urea blowing reaction is substantially complete prior to the completion of the trimerization (isocyanurate) reaction. Such urea polymerization catalysts include the tertiary amines well-known in the art for promoting water-isocyanate reactions. Representative examples of suitable urea polymerization catalysts are bis-dimethylaminoethyl ether, dimethylamino ethoxy ethanol, N-methyl morpholine, N-methyldicyclohexylamine, and N-ethyl morpholine. A preferred group of urea polymerization catalysts are the ether-containing tertiary amines, e.g., bis-dimethylaminoethyl ether sold under the tradename NIAX A-1 by Union Carbide, dimethylamino-ethoxyethanol sold by Pennwalt, or N,N-dimethyl-3-[2-dimethyl amino ethoxy] propyl amine sold under the tradename THANCAT DD by Texaco.

Isocyanuarate polymerization catalysts suitable for use in the present invention include any of the conventional trimerization catalysts well-known in the art which will provide a foam reaction profile such that the urea blowing reaction is substantially complete prior to the completion of the trimerization reaction. The isocyanurate polymerization catalyst should, however, be of sufficient isocyanurate catalytic activity so that, as the foam of the invention rises, it can support its own weight and will not substantially collapse. Examples of isocyanurate polymerization catalysts that can be employed in the present invention include those disclosed in U.S. Pat. Nos. 3,657,161, 3,887,501 and 3,931,161, the disclosures of which are incorporated herein by reference for the purpose of explemifying such suitable isocyanurate polymerization catalysts. Representative examples of suitable isocyanurate polymerization catalysts are (1) tertiary amine catalyst such as substituted triazines, e.g., tri (dimethylamino propyl) triazine; (2) basic salts of weak organic acids such as alkali metal salts of alkanoic acids, e.g. potassium octoate and potassium hexoate; and (3) phospholines such as 1-phenyl-3-phospholine, 3-methyl-1-phenyl-3-phospholine, 1-ethyl-3-phospholine, and 3-methyl-1-phenyl-3-phospholine-1-oxide.

Although the urea and isocyanurate polymerization catalysts cannot be completely categorized as to their catalytic function, the present invention contemplates a combination of a catalyst which predominantly causes the reaction between water and isocyanate form urea bonds and of a catalyst which predominantly causes trimerization of the isocyanate, so that the combination provides a reaction profile such that the urea blowing reaction is substantially complete prior to the completion of the trimerization reaction. Thus, the present invention contemplates the use of a combination of catalysts each of which causes substantially only one of the two primary reactions taking place in the foam formation. Moreover, since setting shortly after rising is highly desirable, the combined catalyst system should also provide a foam in which the gel or set time is between the initial rise time and final rise time, but in which the gel or set time is at least about 85% of the final rise time and preferably at least about 90% of the final rise time.

The foam of the present invention is formed in the presence of water. The water acts as a blowing agent and also decreases the density of the foam. By the use of a urea polymerization catalyst in combination with an isocyanurate polymerization catalyst and by controlling the relative amounts of these catalysts in relation to the water and multi-functional isocyanurate present in the reaction mixture, a urea modified isocyanurate foam is produced which has a low density and which sets after substantially complete rising thereof. Preferably, the foam of the present invention is formed in the presence of from about 0.01 to about 3.5 parts by weight water per 100 parts by weight of the multi-functional isocyanate. More preferably, the foam is formed in the presence of from about 0.8 to about 1.5 parts by weight water per 100 parts by weight of the multi-functional isocyanate.

The amounts of urea polymerization catalyst and isocyanurate polymerization catalyst vary depending upon a number of factors, including the type and amount of multi-functional isocyanate employed, the amount of water employed, etc. Enough urea polymerization catalyst is employed to obtain early rising of the foam and low density, and the amount of isocyanurate polymerization catalyst is chosen so that the foam sets after such early rising in order to obtain the effect described above wherein the foam sets after substantially complete rising thereof.

Typically, the urea polymerization catalyst will be present in amounts of from about 0.05 to about 0.30 parts by weight, preferably, from about 0.15 to about 0.25 parts, per 100 parts of the multi-functioned isocyanate, with the amount actually used depending on the activity of the catalyst in driving the urea reaction. For example, Niax A-1 (Union Carbide) is a more active urea polymerization catalyst than Thancat DD (Texaco), and therefore, less Niax A-1 can be used than when Thancat DD is employed.

Typically, the isocyanurate polymerization catalyst will be present in amounts of from about 1.0 to about 5.0 parts by weight preferably from about 2.5 to about 3.5 parts, per 100 parts of the multi-functional isocyanate. As with the urea polymerization catalyst, the amount actually used will depend on the activity of the catalyst in driving the isocyanurate reaction. Thus, for example, since potassium octanoate commercially available as T-45 (M&T Chemicals) is more active as an isocyanurate catalyst than tri (dimethyl-aminopropyl) triazine commercially available as Polycat P-41 (Abbott), less T-45 can be employed than when Polycat P-41 is used.

While we do not wish to be held to a theory of our invention, we believe that the invention provides its desirable advantages because the urea polymerization catalyst initiates an early reaction between the water and the multi-functional isocyanate which reaction causes early rising of the foam. We believe that after this early rising caused by the urea reaction, the reaction profile is then dominated by the slower initiating isocyanurate reaction caused by the isocyanurate catalyst. The overall reaction profile is thus controlled so that a low density foam is formed which sets after substantially complete rising thereof.

One embodiment of the present invention comprises an activator composition which can be mixed with multi-functional isocyanate to obtain the foams of the present invention. The activator composition comprises water, urea polymerization catalyst and isocyanurate polymerization catalyst in relative amounts so that, when a predetermined amount of such activator composition is mixed with a predetermined amount of multi-functional isocyanate, the foam produced has a density of from about 0.6 to about 1.5 pounds per cubic foot and sets after substantially complete rising thereof. Preferably, the activator composition is prepared from the urea and isocyanurate polymerization catalysts described above and comprises water, urea polymerization catalyst and isocyanaurate polymerization catalyst in the following relative amounts by weight: from about 0.05 to about 0.30 parts of said urea polymerization catalyst, from about 1.0 to about 4.0 parts of said isocyanurate polymerization catalyst, and from about 0.01 to about 3.5 parts of water. The relative predetermined amounts of the activator composition and the multi-functional isocyanate composition can thus be determined so that the weight relationship of each of these three components of the activator composition to 100 parts of multi-functional isocyanate are as described above, e.g., so that there are from about 0.5 to about 0.30 parts of the urea polymerization catalyst per 100 parts of multi-functional isocyanate.

In a preferred embodiment of the invention, the activator composition contains polyol and thus the foam is modified by forming the foam in the presence of a polyol. In such an instance, the urea modified isocyanurate foam of the invention also contains urethane linkages. Preferably, the polyol has a functionality of from 2 to 8, a molecular weight of from 62 to 3000, and a hydroxy number of from about 30 to 800. The foam of the present invention can be prepared by forming the foam in the presence of from about 2 to about 300 parts by weight of the polyol per 100 parts by weight of the multi-functional isocyanate, and more preferably, from about 5 to about 20 parts by weight of a polyol, having a hydroxyl number in the 100–400 range, per 100 parts by weight of the multi-functional isocyanate. Preferably, the polyol is present in amounts so that the NCO-/OH equivalent ratio is greater than about 1.5, preferably, from about 1.5 to about 6.0, and more preferably, from about 2.0 to about 5.5. The polyols suitable for use in the present invention include those well-known in the art for inclusion in polyurethane and isocyanurate foams, such as the polyols mentioned in U.S. Pat. No. 3,887,501. One particularly preferred group of polyols for use in the present invention are those containing secondary hydroxyl groups, e.g. the polyol sold under the tradename LG-168 by Union Carbide. Exemplary of suitable polyols are (1) hydroxyl terminated polyesters such as those obtained by reacting a polycarboxylic acid with a polyhydric alcohol, (2) alkylene ether polyols such as those obtained by reacting an alkylene oxide with a polyhydric alcohol, e.g., propoxylated sucrose, and (3) aliphatic polyols such as sorbitol, sucrose, pentaerythritol, glycerol, diethanol amine, and ethylene glycol.

The urea modified isocyanurate foam of the present invention can also be modified by forming the foam in the presence of a primary or secondary terminated polyamine. In such an instance, the foam contains additional urea linkages. Suitable polyamines include those having a functionality of 2 to 10 and a molecular weight of 60 to about 3000. The polyamines suitable for use in the present invention include any of those well-known in the art for inclusion in polyurethane, polyurea and/or isocyanurate foams, such as the polyamines disclosed in U.S. Pat. No. 3,887,501. Exemplary polyamines include heterocyclic polyamines; aromatic polyamines such as methylene dianiline, crude methylene dianiline (polyaryl-polyalkylene polyamine), and p-aminoaniline; and aliphatic polyamines such as 1,3-propylene diamine and ethylene diamine. If desired, the foam of the present invention can be formed in the presence of from about 1 to about 100 parts by weight of the polyamine per 100 parts by weight of the multi-functional isocyanate.

In another embodiment, the present foam can be formed in the presence of an additional blowing agent besides water. Suitable blowing agents include chlorofluorinated alkanes containing from 1 to 3 carbon atoms and at least one fluorine atom, such as trichlorofluoromethane, dichlorofluoromethane, dichlorotetrafluoroethane, and trichlorotrifluoroethane; and lower molecular weight hydrocarbons containing from 4 to 7 carbon atoms, such as methane, ethane, propane, propylene, pentane, and/or hexane. Preferably, the foam of the present invention is modified by forming the foam in the presence of from about 10 to 100 parts by weight of one or more of such blowing agents per 100 parts by weight of the multi-functional isocyanate.

The foam of the present invention can also contain many other constituents well known in the art for insulation and foam materials. For example, the foam of the present invention can contain a combustion modifier such as one of the well-known phosphorous and/or halogen-containing combustion modifiers. Suitable combustion modifiers for inclusion in the foam of the present invention include Fyrol CEF, Fyrol PCF, and Fyrol DMMP (all sold by Stauffer Chemical). If desired, these combustion modifiers can be included in the foam of the present invention in amounts of from about .5 to about 50 parts by weight per 100 parts by weight of the multi-functional isocyanate.

Similarly, the foam of the present invention can be prepared in the presence of surfactants, such as conventional urethane, silicone, or organic surfactants. Suitable surfactants include the well-known polysiloxane polyalkoxane copolymers or organic surfactants used in the art to control foam cell structure. Examples of suitable surfactants include a silicone surfactant sold under the tradename L-5340 (Union Carbide Corp.) and an organic surfactant sold under the tradename LK-443 (Air Products and Chemicals). Such surfactants can be included in the foam of the present invention in amounts of from about 0.01 to about 5 parts by weight per 100 parts by weight of the multi-functional isocyanate.

In yet another embodiment of the invention, the urea-modified isocyanurate foam can also be formed in the presence of the softening agents as described in the copending application Ser. No. 391,007, filed June 23, 1982, now U.S. Pat. No. 4,401,769, of Nelson Malwitz entitled "Foam, Composition and Method Useful For Retrofit Insulation" filed the same day as the present application, the disclosure of which copending application is incorporated herein by reference. As described in such copending application, these softening agents act in a way so as to temporarily delay the setting or gelling of the urethane, amide, urea, carbodiimide and/or isocyanurate linkages within the freshly formed foam. The addition of the softening agents helps achieve the desired and necessary process properties for a retrofit insulating foam.

The quantity of the selected softening agent in the formulation must be judiciously selected. If too little is used, the gel time is not properly delayed beyond the rise time. If too much is used, undesirable side effects such as poor long-term dimensional stability, poor humid aging and shrinkage can result. Thus, the amount of the softening agent varies depending on various factors, including, for example, the softening agent being used. Of course, the amount of the softening agent used in the processes and foams of the present invention takes into consideration the amounts of water, urea polymerization catalyst, and isocyanurate polymerization catalyst present so that the gel time exceeds the rise time of the foam. Typically, from about 0.05 to about 5.0 parts by weight of the softening agent is used per 100 parts by weight of the multi-functional isocyanate. More preferably, the foam of the present invention is modified by forming the foam in the presence of from about 0.3 to about 1.0 parts of the softening agent per 100 parts by weight of the multi-functional isocyanate.

Suitable softening agents include chlorinated alkanes, brominated alkanes, alkyl esters of an alkanoic acid, alkylene oxides, aromatic hydrocarbons, acylnitriles, aliphatic ketones, aliphatic aldehydes, aliphatic ethers, cyclic ethers, amides of alkanoic acids and mixtures thereof. Preferably, these softening agents contain from 1 to 20 carbon atoms, and more preferably, from 1 to 10 carbon atoms. Examples of suitable softening agents are methylene chloride, carbon tetrachloride, chloroform, ethylene chloride, ethyl acetate, methyl formate, propylene oxide, benzene, acetonitrile, acetone, diethyl ether, tetrahydrofuran, and mixtures of such compounds. Methylene chloride is a preferred softening agent.

The foam of the present invention is very advantageously used as an insulation material in filling wall cavities. This is accomplished by placing a hole in the wall containing the cavity which is to be filled with the urea-modified isocyanurate foam insulation material of the present invention. Foam-forming reactants are simply added well mixed through the hole into the wall cavity. These foam-forming reactants comprise multi-functional isocyanate, water, a catalytically effective amount of a urea polymerization catalyst, and a catalytically effective amount of an isocyanurate polymerization catalyst, wherein said urea polymerization catalyst and said isocyanurate polymerization catalyst are present in relationship to the multi-functional isocyanate and water in amounts so as to produce a foam setting after substantially complete rising thereof. Of course, during the formation of the foam, other materials such as polymerizing materials (e.g., polyols, polyamines, etc.), blowing agents, softening agents, combustion modifiers, and surfactants as mentioned above can also be included. After this mixing, these components are allowed to react to form the foam and to fill the cavity. Normally, a sufficient amount of the above formulation is added to completely fill the cavity. Because the foam has a gel time which approximates the rise time of the foam, the foam of the present invention rises, and any excess foam is extruded through the hole through which the foam was added. After the foam has completed its major rise, the foam gels and sets. Because the foam of the present invention completes its major rise prior to gelling or setting, it does not exert damaging excess pressure on the walls of the cavity which has been filled. Thus, the foam and process of the present invention avoid the buckling and even cracking of the walls which accompanied previous techniques for filling wall cavities with urethane or isocyanurate foam insulation materials.

In performing the process of the present invention, good mixing of the components of the reaction is highly desirable. Such mixing can be performed by any of the means well-known in the art for the purpose. For example, a positive displacement pumping device can be used in which the foam-forming reactants are divided into two components which are then mixed in an impingement type mixer/dispenser and poured through the orifice, for example, into a wall cavity to be insulated.

In one preferred embodiment, the foam-forming reactants are divided into two components for mixing to form the foam of the invention. In one such component the multi-functional isocyanate can be present along with any optional non-reactive, isocyanate compatible ingredients in the formulation, for example, a blowing agent, a softening agent, a surfactant, a combustion modifier, etc. as described above. The second component (activator composition) preferably contains the remaining ingredients of the formulation, including the materials causing polymerization of the multi-functional isocyanate (i.e., the water, urea polymerization catalyst and the isocyanurate polymerization catalyst) along with any optional ingredients compatible therewith, e.g., a blowing agent, a softening agent, a surfactant, a combustion modifier, etc. The activator composition is mixed with a predetermined amount of the multi-functional isocyanate composition so that the foam produced has the desired characteristics, i.e., it has a density of from about 0.6 to about 1.5 pounds per cubic foot and acts after substantially complete rising thereof. These two components can be mixed with an impingement type mixer/dispenser as described above and the mixture can be fed into a wall cavity to provide insulation in such cavity. As the formulation is dispensed, conditions of temperature and pressure of the premixtures are dictated by the formulation as it pertains to obtaining the required mixedness and reaction profile.

In yet another embodiment of the invention, the second component described above contains polyol and water so that, when the second component is mixed with the multi-functional isocyanate, a NCO/OH equivalent ratio of greater than about 1.5, preferably from about 1.5 to about 6.0, and more preferably from about 2.0 to about 6.0, is provided and the components react to form a rigid, closed cell foam which has a density in the range of from about 0.6 to about 1.5 pounds per cubic foot and which sets after substantially complete rising thereof.

The following examples are presented for the purpose of illustrating, but not limiting, the process and foam of the present invention.

EXAMPLE 1

An isocyanate premix and an activator premix were prepared according to the following formulation:

| Isocyanate Premix | Parts/Hundred |
|---|---|
| Crude MDI[1] | 89.0 |
| Trichlorofluoromethane | 10.0 |
| L-5340 | 1.0 |

| Activator Premix | Parts/Hundreds |
|---|---|
| LG-168[2] | 41.50 |
| Polycat 42[3] | 3.00 |
| Niax A-1[4] | .50 |
| M&T T-45[5] | 5.00 |
| Water | 3.00 |
| Unitol LFA[6] | 1.00 |
| L-5340 | 1.00 |
| F-11B | 45.00 |

[1]Mondur MR (Mobay): Rubinate M (Rubicon)
[2]A polyol (glycerine initiated propylene oxide adduct having a hydroxyl number of about 168 containing secondary hydroxyl groups) available from Union Carbide Corp.
[3]Potassium octoate available from Abbott Laboratories.
[4]Bis-(dimethylaminoethyl) ether available from Union Carbide.
[5]Potassium octoate available from M&T Chemical.
[6]Blend of fatty acids available from Union Camp Chemical.

Three (3) parts by weight of the isocyanate premix and one (1) part by weight of the activator premix were combined and intimately mixed at 70#F. and the foam product was allowed to form. The major rise time of the foam formed was 25 seconds, the gel time of the foam was 48 seconds, and the final rise time or tack free time was 120 seconds. The foam product had a density of 1.14 pcf (pound per cubic foot).

EXAMPLE 2

The procedure of Example 1 was repeated, except that the strong blowing catalyst Naix A-1 was not used, but rather the weaker blowing catalyst Polycat 42 was relied upon. The activator premix had the following formulation:

| Activator Premix | Parts/Hundred |
|---|---|
| LG-168 | 42.00 |
| Polycat 42 | 3.00 |
| T-45 | 5.00 |
| Water | 3.00 |
| LFA | 1.00 |
| L-5340 | 1.00 |
| F-11 | 45.00 |

The major rise time of the foam produced was slower because of the absence of Niax A-1 catalyst but was found to be 62 seconds, while the gel time was found to be 106 seconds. The foam produced had a density of 1.10 pcf. This foam was found to have a coarser cell structure than Example 1. The final rise or tack free time of this foam was greater than 240 seconds and is therefore not as desirable a product as the foam of Example 1.

EXAMPLE 3

The procedure of Example 1 was again repeated, except the isocyanate activator premix contained less water. The activator premix had the following formulation:

| Activator Premix | Parts/Hundred |
|---|---|
| LG-168 | 43.50 |
| Polycat 42 | 3.00 |
| Niax A-1 | 0.50 |
| T-45 | 5.00 |
| Water | 1.00 |
| Unitol LFA | 1.00 |
| L-5340 | 1.00 |
| F-11 | 45.00 |

One and one-half parts by weight of the isocyanate premix and one part by weight of the activator premix were used to maintain the isocyanate index of Example 1. The major rise time of the foam formed was 29 seconds, and the gel or set time of the foam was 42 seconds. The foam product had a density of 1.25 pcf.

EXAMPLE 4

The procedure of Example 1 was again repeated, except that the isocyanate premix contained methylene chloride as a softening agent. The isocyanate premix had the following formulation:

| Isocyanate Premix | Parts/Hundred |
|---|---|
| Crude MDI | 89.00 |
| Methylene Chloride | .30 |
| F-11B | 9.70 |
| L-5340 | 1.00 |

The major rise time of the foam was found to be 25 seconds, and the gel time was found to be 102 seconds. The density of the foam was found to be 1.12 pcf.

EXAMPLE 5

The procedure of Example 1 was again repeated, except that another urea blowing catalyst was employed, namely Thancat DD. The activator premix had the following formulation:

| Activator Premix | Parts/Hundred |
|---|---|
| LG-168 | 41.50 |
| Polycat 42 | 3.00 |
| Thancat DD | .50 |
| T-45 | 5.00 |
| Water | 3.00 |
| Unitol LFA | 1.00 |
| L-5340 | 1.00 |
| F-11B | 45.00 |

The major rise time of the foam was 35 seconds, and the gel time was found to be 190 seconds. The density of the foam was found to be 1.12 pcf.

EXAMPLE 6

The procedure of Example 1 was repeated, except that a different isocyanurate polymerizing agent was used in the activator premix, namely DABCO TMR. The activator premix had a formulation as follows:

| Activator Premix | Parts/Hundred |
|---|---|
| LG-168 | 41.50 |
| Polycat 42 | 3.00 |
| Niax A-1 | .50 |
| DABCO TMR[8] | 5.00 |
| Water | 3.00 |
| Unitol LFA | 1.00 |
| L-5340 | 1.00 |
| F-11B | 45.00 |

[8] trimethyl-N—2-hydroxypropyl ammonium hexanoate (50% in dipropylene glycol) available from Air Products.

No foam was produced from this mixture because the rising foam mass was unable to support its own weight due to lack of gel strength. This example demonstrates that an isocyanurate polymerizing agent having a sufficient activity so that the foam supports its own weight (like potassium octoate) is required to produce acceptable foam.

EXAMPLE 7

An isocyanate premix and an activator premix were prepared according to the following formulation:

| Isocyanate Premix | Parts/Hundred |
|---|---|
| Crude MDI (Mondur MR) | 44.5 |
| Crude MDI (Mondur 200)[9] | 44.5 |
| methylene chloride | .3 |
| Freon 11B | 9.7 |
| L-5340 | 1.0 |

[9] A high viscosity crude MDI.

| Activator Premix | Parts/Hundred |
|---|---|
| R-370[10] | 15.0 |
| LG-168 | 25.0 |
| Polycat 42 | 3.0 |
| Niax A-1 | 0.5 |
| T-45 | 5.0 |
| Water | 2.5 |
| Unitol LFA | 1.0 |
| L-5340 | 1.0 |
| Freon-11B | 47.0 |

[10] A propoxylated sucrose (hydroxyl number 370) available from Dow Chemical.

Three parts by weight of the isocyanate premix and one part by weight of the activator premix were combined an intimately mixed at 70#F. The foam product was allowed to form. The foam had a cream time of 4 seconds, a major rise time of 42 seconds, a gel time of 80 seconds, and a tack free time of 120 seconds. The density of the foam produced was 1.1 pcf.

It will be understood that the embodiments described herein are merely exemplary and that a person skilled in the art may make many variations and modifications without departing from the spirit and scope of the invention. All such modifications and variations are intended to be included within the scope of the invention as defined in the appended claims.

What is claimed is:

1. A process for the preparation of a rigid, closed cell, urea-modified isocyanurate foam, said process comprising reacting foam-forming reactants comprising multi-functional isocyanate and water in the presence of a catalytically effective amount of a first catalyst comprising an ether-containing tertiary amine which catalyzes the reaction between water and the multi-functional isocyanate and in the presence of a catalytically effective amount of a second catalyst which catalyzes the formation of isocyanurate bonds, wherein said first catalyst and said second catalyst are present in relationship to the multi-functional isocyanate and water in amounts so as to produce a rigid, closed cell foam which sets upon or after substantially complete rising thereof, which has a density of from about 0.6 to about 1.5 pound per cubic foot and which can support its own weight during foaming.

2. A process for filling a wall cavity with insulation, said process comprising the steps of: opening a hole into said cavity; adding foam-forming reactants to said cavity through said hole in amounts such that the foam produced will substantially fill said cavity, said reactants comprising a multi-functional isocyanate, water, a catalytically effective amount of a first catalyst comprising an ether-containing tertiary amine which catalyzes the reaction between water and the multi-functional isocyanate, and a catalytically effective amount of a second catalyst which catalyzes the formation of isocyanurate bonds, wherein said first catalyst and said second catalyst are present in relationship to the multi-functional isocyanate and water in amounts so as to produce a foam which sets upon or after substantially complete rising thereof, which has a density of from about 0.6 to about 1.5 pound per cubic foot and which can support its own weight during foaming; and allowing said reactants to form said foam in said cavity and to fill substantially said cavity.

3. The process according to claim 1 or 2, wherein the first catalyst and second catalyst are such as to provide a reaction profile in which the urea blowing reaction is substantially complete prior to completion of the isocyanurate reaction.

4. The process according to claim 1 or 2, wherein the first catalyst and second catalyst are such as to produce a foam having a set time of at least 85% of the final rise time of the foam.

5. The process according to claim 1 or 2, wherein said multi-functional isocyanate is selected from the group consisting of crude diphenyl methane diisocyanate, diphenyl methane diisocyanate, 2,4-toluene diisocyanate, 2,6-toluene diisocyanate, crude toluene diisocyanate, toluene polyisocyanate, hexamethylene diisocyanate, naphthalene diisocyanate, isoparone diisocyanate, dicyclohexamethylene diisocyanate and mixtures thereof.

6. A process according to claim 1, wherein said multi-functional isocyanate comprises crude diphenyl methane diisocyanate.

7. A process according to claim 2, wherein said multi-functional isocyanate comprises crude diphenyl methane diisocyanate.

8. A process according to claim 1, 2, 6 or 7 wherein said first catalyst is selected from the group consisting of N-methyl morpholine, N-ethyl morpholine, bis-dimethylaminoethyl ether, dimethylamino-ethoxyethanol, N,N-dimethyl-3-[2-dimethylaminoethoxy] propyl amine, and mixtures thereof.

9. The process according to claim 8, wherein said second catalyst is selected from the group consisting of triazine catalysts, alkali metal salts of alkanoic acids, phospholine catalysts, and mixtures thereof.

10. The process according to claim 1, 2, 6 or 7, wherein said first catalyst comprises an ether-containing tertiary amine and said second catalyst comprises an alkali metal salt of an alkanoic acid.

11. The process according to claim 1, 2, 6 or 7, wherein said first catalyst comprises bis dimethylaminoethyl ether and said second catalyst comprises potassium octoate.

12. The process according to claim 9, wherein said first catalyst is present in amounts of from about 0.05 to about 0.30 parts by weight per 100 parts by weight of the multi-functional isocyanate and said second catalyst is present in amounts of from about 1.0 to about 4.0 parts by weight per 100 parts by weight of the multi-functional isocyanate.

13. The process according to claim 1, 2, 6 or 7, wherein said foam is formed in the presence of from about 0.1 to 3.5 parts by weight water per 100 parts by weight of said multi-functional isocyanate.

14. The process according to claim 5, wherein said foam-forming reactants further comprise a member selected from the group consisting of polyol, primary or secondary terminated polyamine, and mixtures thereof.

15. The process according to claim 13, wherein said foam-forming reactants include polyol and said foam contains urethane linkages.

16. The process according to claim 15, wherein said polyol has a functionality of from 2 to 8, a molecular weight of from 62 to 3000 and a hydroxy number of from 30 to 1800.

17. The process according to claim 16, wherein said foam is formed in the presence of from about 5 to about 300 parts by weight of said polyol per 100 parts by weight of the multi-functional isocyanate.

18. The process according to claim 17, wherein said polyol contains secondary hydroxyl groups.

19. The process according to claim 13, wherein said foam forming rectants include primary or secondary terminated polyamine and said foam contains additional urea linkages.

20. The process according to claim 13, wherein said foam is formed in the presence of a blowing agent selected from the group consisting of (1) chlorofluorinated alkanes having from 1 to 3 carbon atoms and at least one fluorine atom; and (2) hydrocarbons having from 4 to 7 carbon atoms.

21. The process according to claim 20, wherein said foam is formed in the presence of from about 10 to about 100 parts by weight of said blowing agent per 100 parts by weight of said multi-functional isocyanate.

22. The process according to claim 21, wherein said blowing agent is trichlorofluoromethane.

23. The process according to claim 13, wherein said foam is formed in the presence of a softening agent selected from the group consisting of a chlorinated alkane, brominated alkane, alkyl ester of an alkanoic acid, alkylene oxide, aromatic hydrocarbon, acylnitrile, aliphatic ketone, aliphatic aldehyde, aliphatic ether, cyclic ether, amide of an alkanoic acid and mixtures thereof; and wherein the water and said softening agent are present in amounts effective to provide a foam setting after substantially complete rising thereof.

24. The process according to claim 23, wherein said foam is formed in the presence of from about 0.05 to about 5 parts by weight of said softening agent per 100 parts by weight of said multi-functional isocyanate.

25. The process according to claim 24, wherein said softening agent is selected from the group consisting of methylene chloride, carbon tetrachloride, ethyl acetate, methyl formate, propylene oxide, benzene, N-methyl pyrrolidone, acetonitrile, ethylene chloride, ethyl ether, acetone, tetrahydrofuran and mixtures thereof.

26. The process according to claim 25, wherein said softening agent is methylene chloride.

27. The process according to claim 25, wherein said softening agent is acetone.

28. The process according to claim 13, wherein said foam contains a combustion modifier.

29. The process according to claim 13, wherein said foam contains a surfactant.

30. A rigid, closed cell, urea modified isocyanurate foam composition which is the reaction product of foam-forming reactants comprising multi-functional isocyanate, water, a catalytically effective amount of a first catalyst comprising an ether-containing tertiary amine which catalyzes the reaction between water and the multi-functional isocyanate, and a catalytically effective amount of a second catalyst which catalyzes the formation of isocyanurate bonds, said first catalyst and said second catlayst being present in relation to the multi-functional isocyanate and water in amounts so as to produce a foam which has a density of from about 0.6 pounds per cubic foot to about 1.5 pounds per cubic foot and which sets upon or after substantially complete rising thereof.

31. A composition according to claim 30, wherein said multi-functional isocyanate comprises crude diphenyl methane diisocyanate.

32. A rigid, closed cell, urea-modified isocyanurate foam composition which is the reaction product of foam-forming reactants comprising multi-functional isocyanate, water, polyol, a catalytically effective amount of a first catalyst comprising an ether-containing tertiary amine which catalyzes the reaction between water and the multi-functional isocyanate, and a catalytically effective amount of a second catalyst which catalyzes the formation of isocyanurate bonds, wherein the NCO/OH equivalent ratio is greater than about 1.5, and wherein said first catalyst and said second catalyst are present in relation to the multi-functional isocyanate and water in amounts so as to produce a rigid foam having a density of from about 0.6 to about 1.5 pounds per cubic foot and setting after substantially complete rising thereof.

33. A composition according to claim 32, wherein said multi-functional isocyanate comprises crude diphenyl methane diisocyanate.

34. The composition according to claim 30, 31, 32 or 33, wherein said urea polymerization catalyst is selected from the group consisting of N-methyl morpholine, N-ethyl morpholine, bis-dimethylaminoethyl ether, dimethylamino-ethoxyethanol, N,N-dimethyl-3-propyl amine, and mixtures thereof.

35. The composition according to claim 34, wherein said second catalyst is selected from the group consisting of triazine catalysts, alkali metal salts of alkanoic acids, phospholine catalysts and mixtures thereof.

36. The composition according to claim 30, 31, 32 or 33, wherein said first catalyst comprises an ether-containing tertiary amine and said second catalyst comprises an alkali metal salt of an alkanoic acid.

37. The composition according to claim 30, 31, 32, or 33, wherein said first catalyst comprises bis dimethylaminoethyl ether and said second catalyst comprises potassium octoate.

38. The composition according to claim 30, 31, 32 or 33, wherein the foam is formed in the presence of from about 0.05 to about 0.30 parts by weight of the first catalyst per 100 parts by weight of the multi-functional isocyanate and in the presence of from about 1.0 to about 4.0 parts by weight of the second catalyst per 100 parts by weight of the multi-functional isocyanate.

39. The composition according to claim 38, wherein said foam is formed in the presence of from about 0.01 to 3.5 parts by weight water per 100 parts by weight of said multi-functional isocyanate.

40. The composition according to claim 30 or 32, wherein said multi-functional isocyanate is selected from the group consisting of crude diphenyl methane diisocyanate, diphenyl methane diisocyanate, 2,4-toluene diisocyanate, 2,6-toluene diisocyanate, crude toluene diisocyanate, toluene polyisocyanate, hexamethylene diisocyanate, naphthalene diisocyanate, isoparone diisocyanate, dicyclohexamethylene diisocyanate and mixtures thereof.

41. The composition according to claim 39, wherein said foam-forming reactants include a member selected from the group consisting of polyol, primary or secondary terminated polyamine, and mixtures thereof.

42. The composition according to claim 4, wherein said polyol has a functionality of from 2 to 8, a molecular weight of from 60 to 3000 and a hydroxy number of from 30 to 800.

43. The composition according to claim 42, wherein said foam is formed in the presence of from about 5 to about 300 parts by weight of said polyol per 100 parts by weight of the multi-functional isocyanate.

44. The composition according to claim 39, wherein said foam is formed in the presence of a blowing agent selected from the group consisting of (1) chlorofluorinated alkanes having from 1 to 3 carbon atoms and at least one fluorine atom; and (2) hydrocarbons having from 4 to 7 carbon atoms.

45. The composition according to claim 44, wherein said foam is formed in the presence of from about 10 to about 100 parts by weight of said blowing agent per 100 parts by weight of said multi-functional isocyanate.

46. The composition according to claim 45, wherein said blowing agent is trichlorofluoromethane.

47. The composition according to claim 39, wherein said foam is formed in the presence of a softening agent selected from the group consisting of a chlorinated alkane, brominated alkane, alkyl ester of an alkanoic acid, alkylene oxide, aromatic hydrocarbon, acylnitrile, aliphatic ketone, aliphatic aldehyde, aliphatic ether, cyclic ether, amide of an alkanoic acid and mixtures thereof; and wherein said water and said softening agent are present in amounts effective to provide a foam setting after substantially complete rising thereof.

48. The composition according to claim 47, wherein said foam is formed in the presence of from about 0.5 to about 5 parts by weight of said softening agent per 100 parts by weight of said multi-functional isocyanate.

49. The composition according to claim 48, wherein said softening agent is selected from the group consisting of methylene chloride, carbon tetrachloride, ethyl acetate, methyl formate, propylene oxide, benzene, N-methyl pyrrolidone, acetonitrile, ethylene chloride, ethyl ether, acetone, tetrahydrofuran and mixtures thereof.

50. The composition according to claim 48, wherein said softening agent is methylene chloride.

51. The composition according to claim 48, wherein said softening agent is acetone.

52. The composition according to claim 39, wherein said foam contains a combustion modifier.

53. The composition according to claim 39, wherein said foam contains a surfactant.

54. An activator composition for preparing a rigid, closed cell, urea-modified isocyanurate foam from a multi-functional isocyanate, said activator composition comprising water, a catalytically effective amount of a first catalyst comprising an ether-containing tertiary amine which catalyzes the reaction between water and the multi-functional isocyanate and a catalytically effective amount of a second catalyst which catalyzes the formation of isocyanurate bonds so that, when a predetermined amount of said activator composition is reacted with a predetermined amount of said multi-functional isocyanate, the foam produced has a density in the range of from about 0.6 to about 1.5 pounds per cubic foot, supports its own weight during foaming and sets upon or after substantially complete rising thereof.

55. An activator composition which, when mixed with a multi-functional isocyanate forms a rigid, closed cell foam, said composition comprising water, polyol, a catalytically effective amount of a first catalyst comprising an ether-containing tertiary amine which catalyzes the reaction between water and the mutli-functional isocyanate, and a catalytically effective amount of a second catalyst which catlyzes the formation of isocyanurate bonds, wherein said composition, when mixed with an amount of said multi-functional isocyanate to form a mixture having a NCO/OH equivalent ratio greater than about 1.5, reacts to form a rigid, closed cell foam having a density in the range of from about 0.6 pounds per cubic foot to about 1.5 pounds per cubic foot, supporting its own weight during foaming and setting upon or after substantially complete rising thereof.

56. The activator composition according to claim 54 or 53, wherein said activator composition comprises first catalyst, second catalyst and water in the following relative amounts by weight: from about 0.05 to about 0.30 parts of said first catalyst, from about 1.0 to about 4.0 parts of said second catalyst, and from about 0.01 to about 3.5 parts of water.

57. The activator composition according to claim 55, which further comprises from about 1 to about 300 parts by weight of a polyol in relation to said relative amounts by weight of first catalyst, second catalyst and water.

58. The activator composition according to claim 57, wherein said polyol has a functionality of 2 to 8, a molecular weight of from 60 to 3000 and a hydroxy number of from 30 to 800.

59. The activator composition according to claim 55, which further comprises a polyamine.

60. The activator composition according to claim 55, which further comprises from about 10 to about 100 parts by weight of a blowing agent in relation to said relative amounts by weight of first catalyst, second catalyst and water, wherein said blowing agent is selected from the group consisting of (1) chlorofluorinated alkanes having from 1 to 3 carbon atoms and at least one fluorine atom, and (2) hydrocarbons having from 4 to 7 carbon atoms.

61. The activator composition according to claim 55, which further comprises from about 0.05 to about 5 parts by weight of a softening agent in relation to said relative amounts by weight of first catalyst, second catalyst and water, wherein said softening agent is selected from the group consisting of a chlorinated alkane, brominated alkane, alkyl ester of an alkanoic acid, alkylene oxide, aromatic hydrocarbon, acylnitrile, aliphatic ketone, aliphatic aldehyde, aliphatic ether, cyclic ether, amide of an alkanoic acid and mixtures thereof.

62. The activator composition according to claim 61, wherein said softening agent is methylene chloride.

63. The activator composition according to claim 55, which further comprises from about 5 to about 50 parts by weight of a combustion modifier in relation to said relative amounts by weight of the first catalyst, second catalyst and water.

64. The activator composition according to claim 55, which further comprises from about 0.1 to about 5 parts by weight of a surfactant in relation to said relative amounts by weight of the first catalyst, second catalyst and water.

* * * * *

UNITED STATES PATENT AND TRADEMARK OFFICE
CERTIFICATE OF CORRECTION

PATENT NO. : 4,425,446
DATED : June 23, 1982
INVENTOR(S) : Malwitz et al.

It is certified that error appears in the above-identified patent and that said Letters Patent are hereby corrected as shown below:

```
Column  1, line 12, "Mnay" should read --Many--.
Column  2, line 14, "3,524,820" should read --3,524,825--
Column  2, line 15, "3,876,867" should read --3,876,567--.
Column  2, line 16, "3,384,359" should read --3,984,359--.
Column  2, line 19, "certin" should read --certain--.
Column  3, line 35, "comprised" should read --compressed--.
Column  3, line 50, "(MDI)." should read --MDI).--.
Column 15, line 27, "N,N-dimethyl-3-propyl" should read
                    --N,N-dimethyl-3-[2-dimethylamino-ethoxyl]-
                    propyl--.
Column 15, line 65, "claim 4" should read --claim 41--.
Column 16, line 66, "mutli" should read --multi--.
Column 17, line 11, "53" should read --55--.
```

Signed and Sealed this

Seventeenth Day of April 1984

[SEAL]

Attest:

GERALD J. MOSSINGHOFF

Attesting Officer           Commissioner of Patents and Trademarks